United States Patent
Zhang et al.

(10) Patent No.: US 11,782,014 B2
(45) Date of Patent: Oct. 10, 2023

(54) INTERNAL ELECTROLYTE LAYER COMPRISING CARBON PASTE FOR POTENTIOMETRIC ION SELECTIVE ELECTRODE

(71) Applicant: Siemens Healthcare Diagnostics Inc., Tarrytown, NY (US)

(72) Inventors: Wei Zhang, Needham, MA (US); Robert Bergquist, Middleboro, MA (US); Amir Dolaty, Norwood, MA (US); Todd Andrade, Foxboro, MA (US); Amanda Whittaker, Charlestown, MA (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 601 days.

(21) Appl. No.: 16/609,539

(22) PCT Filed: May 8, 2018

(86) PCT No.: PCT/US2018/031541
§ 371 (c)(1),
(2) Date: Oct. 30, 2019

(87) PCT Pub. No.: WO2018/208742
PCT Pub. Date: Nov. 15, 2018

(65) Prior Publication Data
US 2020/0057017 A1  Feb. 20, 2020

Related U.S. Application Data

(60) Provisional application No. 62/503,588, filed on May 9, 2017.

(51) Int. Cl.
*G01N 27/333* (2006.01)
*H01M 10/0568* (2010.01)

(52) U.S. Cl.
CPC ....... *G01N 27/3335* (2013.01); *G01N 27/333* (2013.01); *H01M 10/0568* (2013.01)

(58) Field of Classification Search
CPC .................. G01N 27/333; G01N 27/3335
See application file for complete search history.

(56) References Cited

U.S. PATENT DOCUMENTS 3,853,731 A * 12/1974 Gray .................... G01N 27/36
29/25.03
4,214,968 A    7/1980 Battaglia et al.
(Continued)

FOREIGN PATENT DOCUMENTS

CN    104245042 A    12/2014
EP      1702208 A1 *  9/2006 ............ B82Y 30/00
(Continued)

OTHER PUBLICATIONS

JPH 0580019 Machine Translation (Year: 1993).*
(Continued)

*Primary Examiner* — Caitlyn Mingyun Sun

(57) ABSTRACT

Disclosed are internal electrolyte layers for ion selective electrodes, wherein the internal electrolyte layers contain carbon paste doped with a metal salt. Also disclosed are ion selective electrodes and sensor array assemblies containing the internal electrolyte layers. Also disclosed are methods of producing and using the internal electrolyte layers, ion selective electrodes, and sensor array assemblies.

12 Claims, 5 Drawing Sheets

(56) References Cited

U.S. PATENT DOCUMENTS

| | | | |
|---|---|---|---|
| 5,417,836 A * | 5/1995 | Masuda | G01N 27/333 204/419 |
| 8,425,745 B2 | 4/2013 | Briman et al. | |
| 8,496,800 B2 | 7/2013 | Zhang et al. | |
| 2012/0268134 A1 | 10/2012 | Lafitte et al. | |
| 2015/0082874 A1 | 3/2015 | Samproni et al. | |
| 2017/0030856 A1 | 2/2017 | Zhang et al. | |

FOREIGN PATENT DOCUMENTS

| | | | |
|---|---|---|---|
| EP | 1702208 B1 | 12/2016 | |
| EP | 3264074 A1 | 1/2018 | |
| JP | H0749329 A | 2/1995 | |
| JP | 2003525450 A | 8/2003 | |
| JP | 2004340965 A | 12/2004 | |
| JP | 2016188872 A | 11/2016 | |
| JP | 2017511470 A | 4/2017 | |
| WO | 2010021923 A1 | 2/2010 | |
| WO | 2015160755 A1 | 10/2015 | |
| WO | WO-2015160755 A1 * | 10/2015 | G01N 27/333 |
| WO | 2016126593 A1 | 8/2016 | |

OTHER PUBLICATIONS

Junichi (JPH0580019) machine translation (Year: 1993).*
International Search Report and Written Opinion of International Application No. PCT/US2018/031541 dated Jul. 16, 2018.
European Search Report and Search Opinion of European Application No. 18797692.3 dated Apr. 17, 2020.
Spichiger et al., "Critical parameters and optimization of a magnesium-selective liquid membrane electrode for application to human blood serum", 1991, Fresenius' Journal of Analytical Chemistry 341, pp. 727-731.
Zhang et al., "A Comparison of Neutral Mg2+—Selective Ionophores in Solvent Polymeric Membranes: Complex Stoichiometry and Lipophilicity", Jan. 2000, Analytical Sciences vol. 16, pp. 11-18.
Ursula E. Spichiger, "History of the Development of Magnesium-Selective Ionophores and Magnesium-Selective Electrodes", 1993, Electroanalysis, 5, pp. 739-745.
Wei Zhang, "Study of Physiologically Required Selectivity Coefficients of Potentiometric Sensors in Clinical Assays", 2005, Life Science Journal 2(1), pp. 40-45.
Vanavanan et al., "Performance of a multi-profile cirtical care testing analyzer", 2008, Clin Chem Lab Med 46(1), pp. 9-14.
Yuan et al., "Eliminating the Interference of Ascorbic Acid and Uric Acid to the Amperometric Glucose Biosensor by Cation Exchangers Membrane and Size Exclusion Membrane", Dec. 19, 2005, Electroanalysis, vol. 17, No. 24, pp. 2239-2245.
Ummadi et al., "Carbon Based Solid-State Calcium Ion-Selective Microelectrode and Scanning Electrochemical Microscopy: A Quantitative Study of pH-Dependent Release of Calcium Ions from Bioactive Glass", Mar. 15, 2016, Analytical Chemistry vol. 88, No. 6, pp. 1-20.
Mensah et al., "Nanomolar Detection Limits of Cd2+, Ag+, and K+ Using Paper-Strip Ion-Selective Electrodes", Jul. 15, 2014, Analytical Chemistry, vol. 86, No. 15, pp. 1-2 (Abstract).

* cited by examiner

INTERNAL ELECTROLYTE LAYER COMPRISING CARBON PASTE FOR POTENTIOMETRIC ION SELECTIVE ELECTRODE

CROSS REFERENCE TO RELATED APPLICATIONS/INCORPORATION BY REFERENCE STATEMENT

The subject application claims benefit under 35 USC § 119(e) of U.S. provisional Application No. 62/503,588, filed May 9, 2017. The entire contents of the above-referenced patent application are hereby expressly incorporated herein by reference.

STATEMENT REGARDING FEDERALLY SPONSORED RESEARCH OR DEVELOPMENT

Not Applicable.

BACKGROUND

Magnesium assays are increasingly being requested in hospitals and clinical research institutions. A robust magnesium ion sensor capable of detecting a biologically active portion of ionized magnesium can aid in the clinical diagnosis of patients.

The use of ion selective electrodes (ISEs) to determine the presence and quantity of various analytes in biological samples has become a useful diagnostic technique. Indeed, ISEs have been used to detect analytes such as magnesium, sodium, potassium, calcium, and chloride, among others. Some of these ISEs are often housed within clinical diagnostic instruments for simultaneous analysis of a large number of analytes.

One such use of the ISEs is for the determination of the amount of magnesium ions in a biological sample, specifically blood. Blood comprises many ions; the main ions present are magnesium ions ($Mg^{2+}$), calcium ions ($Ca^{2+}$), and sodium ions ($Na^+$). The main problem encountered with current magnesium ISEs is a weak selectivity for $Mg^{2+}$ over $Ca^{2+}$.

Current Mg ISEs used in commercial blood gas analyzer products are constructed of three components: a magnesium sensing cover membrane, an internal electrolyte layer, and an internal reference electrode. The magnesium sensing cover membrane may include (for example but not by way of limitation) a plasticized PVC membrane doped with magnesium-sensing ionophore, and may further include other additives. The internal electrolyte (IE) layer commonly contains (for example, but not by way of limitation) aqueous solutions (i.e., AVL-998, KONE Microlyte, Nova SP, and the like), although newer blood ionized magnesium (iMg) analyzers use hydrogel/hydrophilic polymers (i.e., cellulose, acrylic gel, and the like (e.g., Nova CCX)) as the IE. The internal reference electrode is typically constructed of (for example, but not by way of limitation) Ag/AgCl.

For each type of ion, ISEs have a different response kinetic pattern, which causes the data to be greatly skewed if the ISEs are not calibrated to take into account the different selectivities of the ions. Currently, the calibration of potentiometric ISEs for measuring ionized magnesium ("Mg ISE") generally encompasses calibrating the Mg ISE with three calibration reagents which characterize the slope, intercept, and selectivity of the magnesium ions against the calcium ions.

BRIEF DESCRIPTION OF THE SEVERAL VIEWS OF THE DRAWINGS

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component may be labeled in every drawing.

DETAILED DESCRIPTION

Figure 1:
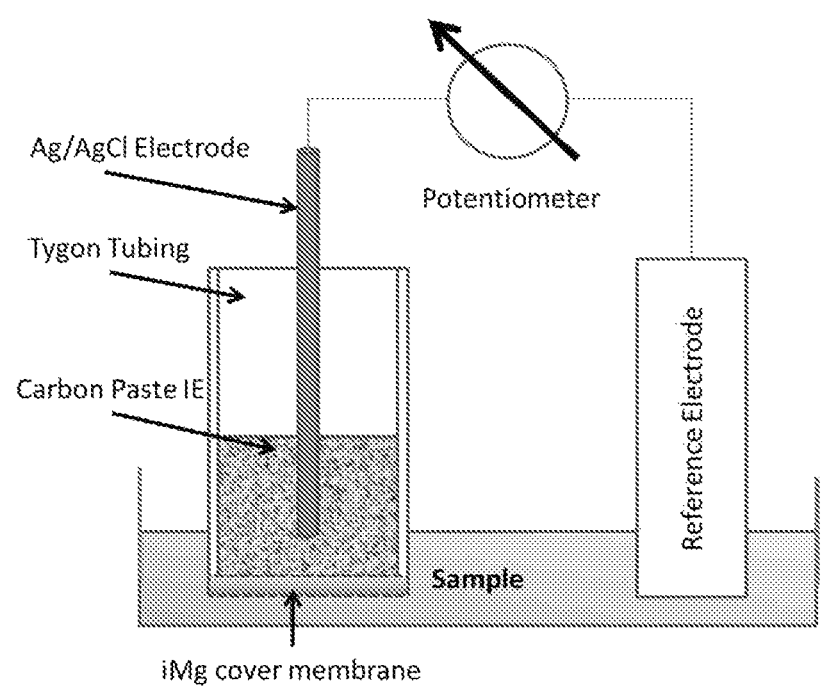
FIG. 1 graphically illustrates one non-limiting embodiment of an ion selective electrode sensor constructed in accordance with the presently disclosed inventive concept(s).

Before explaining at least one embodiment of the inventive concept(s) in detail by way of exemplary language and results, it is to be understood that the inventive concept(s) is not limited in its application to the details of construction and the arrangement of the components set forth in the following description. The inventive concept(s) is capable of other embodiments or of being practiced or carried out in various ways. As such, the language used herein is intended to be given the broadest possible scope and meaning; and the embodiments are meant to be exemplary—not exhaustive. Also, it is to be understood that the phraseology and terminology employed herein is for the purpose of description and should not be regarded as limiting.

Unless otherwise defined herein, scientific and technical terms used in connection with the presently disclosed inventive concept(s) shall have the meanings that are commonly understood by those of ordinary skill in the art. Further, unless otherwise required by context, singular terms shall include pluralities and plural terms shall include the singular. The foregoing techniques and procedures are generally performed according to conventional methods well known in the art and as described in various general and more specific references that are cited and discussed throughout the present specification. The nomenclatures utilized in connection with, and the laboratory procedures and techniques of, analytical chemistry, synthetic organic chemistry, and medicinal and pharmaceutical chemistry described herein are those well-known and commonly used in the art. Standard techniques are used for chemical syntheses and chemical analyses.

All patents, published patent applications, and non-patent publications mentioned in the specification are indicative of the level of skill of those skilled in the art to which this presently disclosed inventive concept(s) pertains. All patents, published patent applications, and non-patent publications referenced in any portion of this application are herein expressly incorporated by reference in their entirety to the same extent as if each individual patent or publication was specifically and individually indicated to be incorporated by reference.

All of the articles, compositions, and/or methods disclosed herein can be made and executed without undue experimentation in light of the present disclosure. While the articles, compositions, and methods of the inventive concept(s) have been described in terms of particular embodiments, it will be apparent to those of skill in the art that variations may be applied to the articles, compositions and/or methods and in the steps or in the sequence of steps of the methods described herein without departing from the concept, spirit, and scope of the inventive concept(s). All such similar substitutes and modifications apparent to those skilled in the art are deemed to be within the spirit, scope, and concept of the inventive concept(s) as defined by the appended claims.

As utilized in accordance with the present disclosure, the following terms, unless otherwise indicated, shall be understood to have the following meanings:

The use of the term "a" or "an" when used in conjunction with the term "comprising" in the claims and/or the specification may mean "one," but it is also consistent with the meaning of "one or more," "at least one," and "one or more than one." As such, the terms "a," "an," and "the" include plural referents unless the context clearly indicates otherwise. Thus, for example, reference to "a compound" may refer to one or more compounds, two or more compounds, three or more compounds, four or more compounds, or greater numbers of compounds. The term "plurality" refers to "two or more."

The use of the term "at least one" will be understood to include one as well as any quantity more than one, including but not limited to, 2, 3, 4, 5, 10, 15, 20, 30, 40, 50, 100, etc. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first," "second," "third," "fourth," etc.) is solely for the purpose of differentiating between two or more items and is not meant to imply any sequence or order or importance to one item over another or any order of addition, for example.

The use of the term "or" in the claims is used to mean an inclusive "and/or" unless explicitly indicated to refer to alternatives only or unless the alternatives are mutually exclusive. For example, a condition "A or B" is satisfied by any of the following: A is true (or present) and B is false (or not present), A is false (or not present) and B is true (or present), and both A and B are true (or present).

As used herein, any reference to "one embodiment," "an embodiment," "some embodiments," "one example," "for example," or "an example" means that a particular element, feature, structure, or characteristic described in connection with the embodiment is included in at least one embodiment. The appearance of the phrase "in some embodiments" or "one example" in various places in the specification is not necessarily all referring to the same embodiment, for example. Further, all references to one or more embodiments or examples are to be construed as non-limiting to the claims.

Throughout this application, the term "about" is used to indicate that a value includes the inherent variation of error for a composition/apparatus/device, the method being employed to determine the value, or the variation that exists among the study subjects. For example, but not by way of limitation, when the term "about" is utilized, the designated value may vary by plus or minus twenty percent, or fifteen percent, or twelve percent, or eleven percent, or ten percent, or nine percent, or eight percent, or seven percent, or six percent, or five percent, or four percent, or three percent, or two percent, or one percent from the specified value, as such variations are appropriate to perform the disclosed methods and as understood by persons having ordinary skill in the art.

As used in this specification and claim(s), the words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described event or circumstance completely occurs or that the subsequently described event or circumstance occurs to a great extent or degree. For example, when associated with a particular event or circumstance, the term "substantially" means that the subsequently described event or circumstance occurs at least 80% of the time, or at least 85% of the time, or at least 90% of the time, or at least 95% of the time. The term "substantially adjacent" may mean that two items are 100% adjacent to one another, or that the two items are within close proximity to one another but not 100% adjacent to one another, or that a portion of one of the two items is not 100% adjacent to the other item but is within close proximity to the other item.

As used herein, the phrases "associated with" and "coupled to" include both direct association/binding of two moieties to one another as well as indirect association/binding of two moieties to one another. Non-limiting examples of associations/couplings include covalent binding of one moiety to another moiety either by a direct bond or through a spacer group, non-covalent binding of one moiety to another moiety either directly or by means of specific binding pair members bound to the moieties, incorporation of one moiety into another moiety such as by dissolving one moiety in another moiety or by synthesis, and coating one moiety on another moiety, for example.

The term "sample" as used herein will be understood to include any type of biological sample that may be utilized in accordance with the presently disclosed inventive concept(s). Examples of fluidic biological samples that may be utilized include, but are not limited to, whole blood or any portion thereof (i.e., plasma or serum), urine, saliva, sputum, cerebrospinal fluid (CSF), skin, intestinal fluid, intraperitoneal fluid, cystic fluid, sweat, interstitial fluid, extracellular fluid, tears, mucus, bladder wash, semen, fecal, pleural fluid, nasopharyngeal fluid, combinations thereof, and the like.

The term "patient" includes human and veterinary subjects. In certain embodiments, a patient is a mammal. In certain other embodiments, the patient is a human. "Mammal" for purposes of treatment refers to any animal classified as a mammal, including human, domestic and farm animals, nonhuman primates, and zoo, sports, or pet animals, such as dogs, horses, cats, cows, etc.

The term "purified" as used herein means at least one order of magnitude of purification is achieved compared to the starting material or of the natural material, for example but not by way of limitation, two, three, four, or five orders of magnitude of purification of the starting material or of the natural material. Thus, the term "purified" as utilized herein does not necessarily mean that the material is 100% purified, and therefore such term does not exclude the presence of other material(s) present in the purified composition.

The term "wetup" as used herein will be understood to refer to the hydration process from the installation of a sensor in an analyzer to a point at which a stable signal is obtained out of calibration reagents.

The term "recovery" as used herein, either alone or in connection with another term (for example but without limitation, "quality control recovery," "recovery period," and "recovery elevation"), is understood to mean the yield of an analytical process with comparison to an assigned value(s) or reference value(s).

The term "ETH," when used to describe particular ionophores utilized in accordance with the present disclosure, denotes the German version of the Swiss Federal Institute of Technology (Eidgenösissche Technische Hochschule).

Commonly used non-ionic surfactants (such as, but not limited to, polyoxyalkylene types of surfactants) present in blood analyzer calibration reagents can severely impact the ionophores present in the magnesium sensing membrane (i.e., malonic acid-based ionophore, the ionophores ETH5506, ETH7025, and ETH3832, and the like). To avoid interference of commonly used polyoxyalkylene nonionic surfactants in blood gas analyzer reagents, International Patent Application Publication No. WO 2015/160755 (published Oct. 22, 2015, the contents of which are hereby expressly incorporated herein by reference) discloses the reformulation of an optimal ratio of ETH5506/borate in the magnesium sensing membrane with minimal surfactant interference.

Selectivity coefficients over $Ca^{2+}$ for all current iMg sensors are insufficient, with a level of log K of approximately 0.1 to 0.5. Therefore, $Ca^{2+}$ correction has to be applied in all current testing systems (i.e., $Ca^{2+}$ sensor performance has to be included in calibration and recovery algorithms).

Therefore, the accuracy and precision of blood $Mg^{2+}$ detection can be affected not only by the sensor's intrinsic performance but also by the variation of the $Ca^{2+}$ sensor during the calibration and sample testing processes. $Mg^{2+}$ calibration and recovery calculations are still affected by selectivity against $Ca^{2+}$, even though the calculations can be compensated to a certain extent with algorithmic manipulation. Furthermore, variation in the performance of the $Ca^{2+}$ sensor also contributes to performance of the iMg sensor, because of the selectivity factor in $Mg^{2+}$ calibration and recovery calculations. That is, $Mg^{2+}$ recovery variation is highly related to imprecision from both the iMg sensor as well as the ionized calcium (iCa) sensor.

Turning now to the presently disclosed inventive concept(s), iMg sensors with improved selectivity against $Ca^{2+}$ are disclosed that minimize the impact from the $Ca^{2+}$ sensor on calibration and recovery calculations. These iMg sensors include the use of a carbon paste in the internal electrolyte layer, rather than an aqueous solution or a hydrogel/cellulose co-polymer. IE salt loading has been proven to affect iMg sensor performance, and the processes of dispensing the carbon paste-containing internal electrolyte layer on a sensor wafer disclosed herein possess a high degree of loading as well as reproducibility. As such, the methods of fabrication of the iMg sensor described herein can be performed with high accuracy and precision, thereby overcoming the current bottlenecks in yielding high quality iMg sensors.

Surprisingly, the presently disclosed carbon paste-containing internal electrolyte iMg (CP IE iMg) sensor shows a Nernstian response in $Mg^{2+}$ solution series (0.1 mM to 10 mM) with reduced response slope and negatively shifted offset in $Ca^{2+}$ solution series. Compared to currently available iMg sensors with aqueous or cellulose IE, the presently disclosed CP IE iMg sensors possess solid and significant improvement of selectivity over $Ca^{2+}$ (SSM, $Mg^{2+}$ range of 0.5 to 10 mM, selectivity coefficient improvement from 0.3 to 0.015). Therefore, the methods described herein produce an iMg sensor with no or minimal $Ca^{2+}$ sensor correction, thereby highly improving the accuracy and precision of the $Mg^{2+}$ results while being less dependent on algorithms for $Ca^{2+}$ correction.

Thus, the presently disclosed CP IE iMg sensors provide several advantages over the sensors of the prior art, including a significant enhancement of the selectivity against the major interfering species of $Ca^{2+}$; this enhancement enables the use of much simpler algorithms of calibration and recovery, with minimal or even no correction on $Ca^{2+}$ interference required. As such, the precision and accuracy of the results obtained with the sensor are significantly improved over the results obtained with prior art sensors. In addition, the presently disclosed production methods also possess several advantages over the prior art methods. The presently disclosed fabrication method, which utilizes a screen printing approach, is significantly more efficient than conventional casting or dispensing approaches; this efficiency is especially an advantage, as it allows for mass production of the sensors.

Certain embodiments of the presently disclosed inventive concept(s) are directed to a new and improved internal electrolyte layer that can be used in the development of new potentiometric ion selective electrodes adaptable for central laboratory and/or POC use. The internal electrolyte layer comprises a carbon paste, and may further include a metal salt dispersed in the carbon paste. The internal electrolyte layer is capable of associating with an internal reference electrode and an ion sensing membrane to form a potentiometric ion selective electrode.

Any carbon pastes known in the art may be utilized in the internal electrolyte layer, so long as the potentiometric ion selective electrode formed therefrom can function in accordance with the presently disclosed inventive concept(s). For example, the carbon paste should be water dispensable as well as electrically conductive. The electrical conductivity feature of the carbon paste enables an electron-ionic charge transfer process between the sensing membrane and the electrode and also provides a stable response signal towards target electrolyte over longer period. Non-limiting examples of carbon pastes that may be utilized include those of the polyurethane elastomer type, such as (but not limited to) UROTUF® L15 (Reichhold LLC, Durham, N.C.).

When present, any metal salt may be utilized in the internal electrolyte layer, so long as the potentiometric ion selective electrode formed therefrom can function in accordance with the presently disclosed inventive concept(s). In particular (but non-limiting) embodiments, the metal salt present in the internal electrolyte layer is a metal salt of the target electrolyte, such as (but not limited to) $MgCl_2$, HCl, NaCl, KCl, $KNO_3$, and $NaClO_4$. For example, addition of $MgCl_2$ to the internal electrolyte layer of the magnesium sensor helps to improve response performance of sensitivity and selectivity against interference. The addition of a metal salt of the target electrolyte to the internal electrolyte layer may also improve offset stability over the uselife of the sensor.

Certain embodiments of the presently disclosed inventive concept(s) are directed to a potentiometric ion selective electrode that detects an ionized analyte in a biological sample and that includes any of the carbon paste-containing internal electrolyte layers described in detail herein above. In addition to the internal electrolyte layer, the potentiometric ion selective electrode further includes an ion sensing membrane and an internal reference electrode, wherein: (i) at least a portion of the internal electrolyte layer is associated with at least a portion of the internal reference electrode, and (ii) at least a portion of the internal electrolyte layer is associated with at least a portion of the ion sensing membrane.

The target analyte(s) may be any analyte present in a fluidic biological sample and that is known in the art or otherwise contemplated herein as being detectable by a potentiometric ion selective electrode. For example (but not by way of limitation), the target analyte may be a cation or anion that could potentially be present in a biological sample. Non-limiting examples of target analytes include magnesium, potassium, calcium, sodium, chlorine, pH, and the like. As such, the ion sensing membrane may be (for example but not by way of limitation) a magnesium sensing membrane, a potassium sensing membrane, a calcium sensing membrane, a sodium sensing membrane, a chlorine sensing membrane, or a pH sensing membrane. In a particular (but non-limiting embodiment), the ion sensing membrane may be a magnesium sensing membrane, and the metal salt present in the internal electrolyte layer may be $MgCl_2$.

The electrode may possess any shape that allows the electrode to function in accordance with the presently disclosed inventive concept(s). For example, in certain non-limiting embodiments, the electrode may be planar or circular in shape. The electrode can be fabricated by any method known in the art or otherwise contemplated herein. Examples of fabrication methods that can be utilized in accordance with the presently disclosed inventive concept(s) include, but are not limited to, screen printing, metal sputtering, photolithography, or any other standard electrode manufacturing method.

Particular (but non-limiting) embodiments of the presently disclosed inventive concept(s) are directed to a potentiometric ion selective electrode that detects ionized magnesium in a biological sample and that includes any of the carbon paste-containing internal electrolyte layers described in detail herein above. In addition to the internal electrolyte layer, the potentiometric includes a magnesium sensing membrane and an internal reference electrode. Any magnesium sensing membranes and internal reference electrodes known in the art or otherwise contemplated herein may be utilized in combination with the carbon paste-containing internal electrolyte layer, so long as the potentiometric ion selective electrode can function in accordance with the methods disclosed or otherwise contemplated herein. For example, the magnesium sensing membrane may be a conventional membrane or a solid-state, planar membrane.

In a particular (but non-limiting) embodiment, the potentiometric ion selective electrode may include a magnesium sensing membrane as disclosed in International Patent Application Publication No. WO 2015/160755 (incorporated supra). In this embodiment, the magnesium sensing membrane includes an ionophore having a tripodal stereochemical structure, a lipophilic borate salt, and a polymer matrix in which the ionophore and lipophilic borate salt are disposed. The polymer matrix includes a polymer and a plasticizer.

In certain embodiments, the lipophilic borate salt may be present in an amount that provides a mol ratio of lipophilic borate salt to ionophore in a range of from about 60 mol % to about 100 mol %. Non-limiting examples of borate:ionophore ratios that may be utilized include about 60 mol %, about 65 mol %, about 70 mol %, about 75 mol %, about 80 mol %, about 85 mol %, about 90 mol %, about 95 mol %, and about 100 mol %. A particular non-limiting example of a borate:ionophore ratio is about 75 mol %.

Any ionophore having a tripodal stereochemical structure that is known or otherwise contemplated within the art and is capable of functioning in accordance with the magnesium sensing membranes of the potentiometric ion selective electrodes of the present disclosure falls within the scope of the presently disclosed inventive concept(s). In one embodiment, the ionophore may have at least one malonic imide functional group.

Non-limiting examples of ionophores that may be utilized in accordance with the presently disclosed inventive concept(s) include ionophores represented by any of the structures of Formulas I-IV:

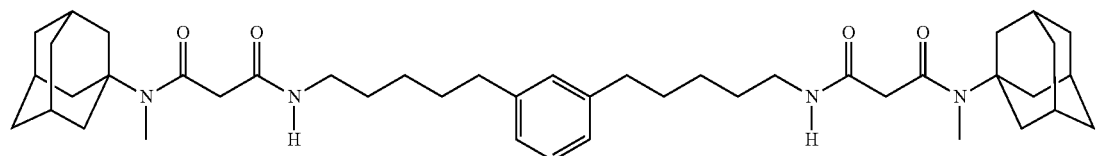

Formula I

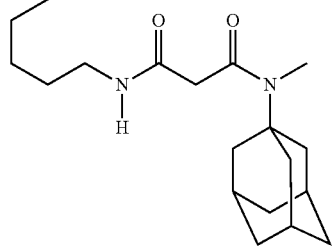

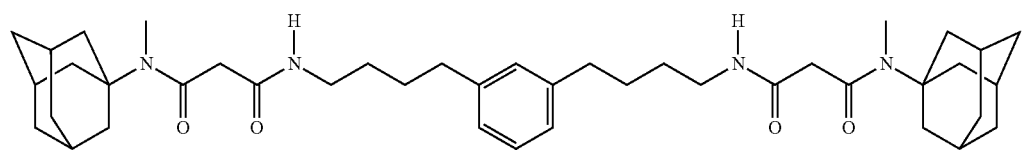

Formula II

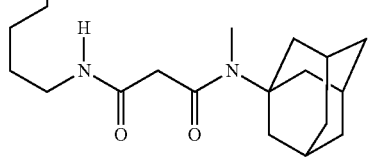

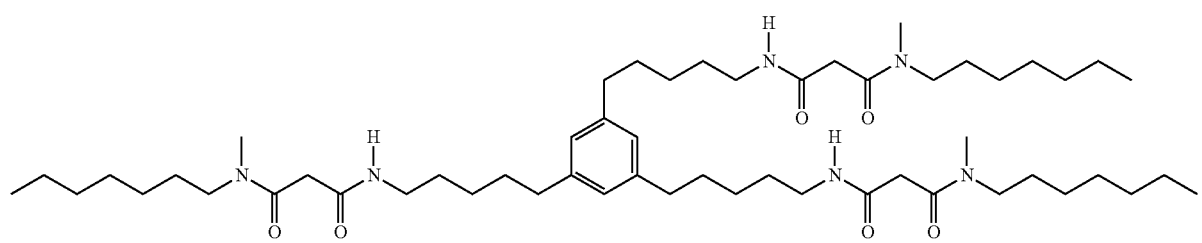

Formula III

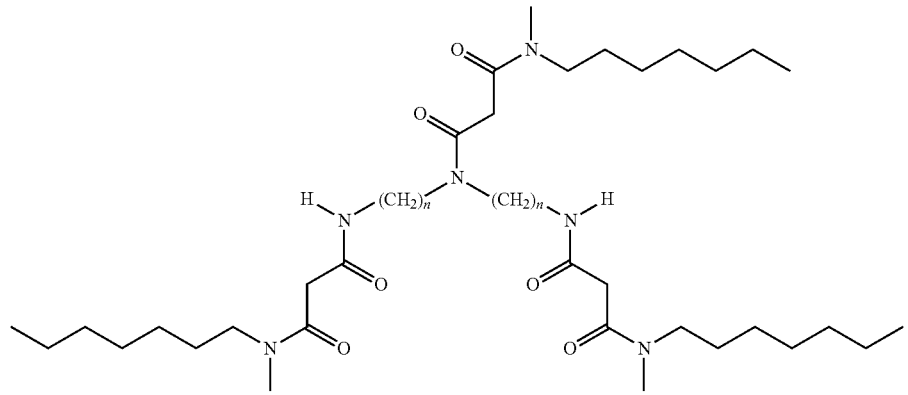

Formula IV

In Formula IV, n is in the range of from about 6 to about 8. The ionophores represented by any of the structures of Formulas I-III are known in the art by the product designations ETH5506, ETH5504, ETH3832, respectively. When n is 6 in Formula IV, the ionophore is known by the product designation ETH5282; when n is 8 in Formula IV, the ionophore is known by the product designation ETH7025.

Any lipophilic borate salt known or otherwise contemplated within the art and capable of functioning as part of the magnesium sensing membranes of the potentiometric ion selective electrodes described herein may be utilized in accordance with the presently disclosed inventive concept(s). Non-limiting examples of lipophilic borate salts that may be utilized herein include the following:

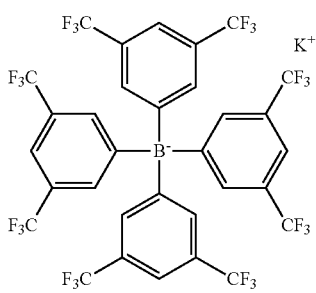 [SMILES: FC(F)(F)c1cc([B-](c2cc(C(F)(F)F)cc(C(F)(F)F)c2)(c2cc(C(F)(F)F)cc(C(F)(F)F)c2)c2cc(C(F)(F)F)cc(C(F)(F)F)c2)cc(C(F)(F)F)c1 ; [K+]]

Potassium tetrakis[3,5-bis(trifluoromethyl)phenyl]borate or Sodium tetrakis[3,5-bis(trifluoromethyl)phenyl]borate; and

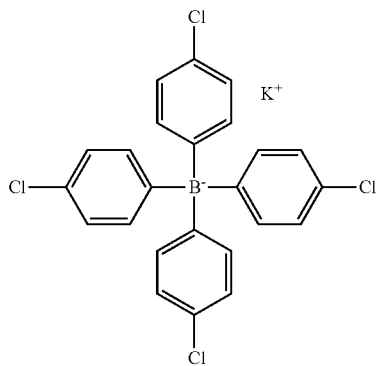 [SMILES: Clc1ccc([B-](c2ccc(Cl)cc2)(c2ccc(Cl)cc2)c2ccc(Cl)cc2)cc1 ; [K+]]

Potassium tetrakis(4-chlorophenyl)borate.

Any polymer known or otherwise contemplated within the art and capable of functioning as part of the magnesium sensing membranes of the potentiometric ion selective electrodes described herein may be utilized as part of the polymer matrix, in accordance with the presently disclosed inventive concept(s). Non-limiting examples of polymers that may be utilized herein include poly(vinyl chloride), polyurethane, and combinations thereof.

Any plasticizer known or otherwise contemplated within the art and capable of functioning as part of the magnesium sensing membranes of the potentiometric ion selective electrodes described herein may be utilized as part of the polymer matrix, in accordance with the presently disclosed inventive concept(s). Non-limiting examples of plasticizers that may be utilized herein include the following:

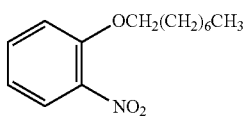

2-Nitrophenyl octyl ether, and

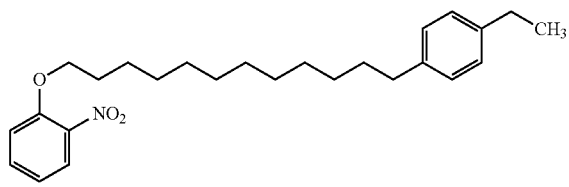 [SMILES: CCc1ccc(CCCCCCCCCCCCOc2ccccc2[N+](=O)[O-])cc1]

[12-(4-Ethylphenyl)dodecyl] 2-nitrophenyl ether.

The internal reference electrode may be constructed of any materials and by any method known in the art or otherwise contemplated herein, so long as the potentiometric ion selective electrode formed therefrom can function in accordance with the presently disclosed inventive concept(s). For example (but not by way of limitation), the internal reference electrode may comprise at least one of gold and silver. In a particular (but non-limiting) example, the internal reference electrode comprises a silver wire with a silver chloride layer disposed thereon.

In certain embodiments, the potentiometric ion selective electrodes of the presently disclosed inventive concept(s) may be multi-use such that said electrode substantially maintains the integrity, response, and precision of the potentiometric ion selective electrode over a use-life and multi-sample exposure period. In a particular (but non-limiting) example, the potentiometric ion selective electrode may substantially maintain the integrity thereof over a use-life of at least about 14 days and a sample capability of at least about 1000 samples, such as (but not limited to) a use-life of at least about 30 days and a sample capability of at least about 3000 samples.

Certain embodiments of the presently disclosed inventive concept(s) include a method of producing any of the potentiometric ion selective electrodes described or otherwise contemplated herein. In the method, a metal salt in solution is dispersed in a carbon paste to form an internal electrolyte layer, and at least a portion of the internal electrolyte layer is screen printed on at least a portion of an internal reference electrode. At least a portion of an ion sensing membrane is then disposed on at least a portion of the internal electrolyte layer. As described in detail herein above, any internal reference electrodes and ion sensing membranes known in the art or otherwise contemplated herein may be utilized in accordance with the method, so long as the potentiometric ion selective electrode produced therefrom can function in accordance with the presently disclosed inventive concept(s). In particular (but non-limiting) embodiments, the ion sensing membrane may be selected from the group comprising a magnesium sensing membrane, a potassium sensing membrane, a calcium sensing membrane, a sodium sensing membrane, a chlorine sensing membrane, and a pH sensing membrane; and/or the metal salt dispersed in the carbon paste may be selected from the group comprising $MgCl_2$, $HCl$, $NaCl$, $KCl$, $KNO_3$, and $NaClO_4$. In an illustrative embodiment, the metal salt may be in a solution when dispersed in the carbon paste. Examples of such a solution include water based solutions.

Certain embodiments of the presently disclosed inventive concept(s) are directed to a method for detecting the presence and/or concentration of a target ion analyte in a fluidic biological sample. In the method, any of the potentiometric ion selective electrodes described or otherwise contemplated herein is contacted with a biological sample, and a level of a specific ion in the biological sample is measured using the potentiometric ion selective electrode. The method may further include the step of reporting the results of said measurement(s) by any method known or otherwise contemplated in the art.

Examples of fluidic biological samples that may be utilized in the method include, but are not limited to, blood, plasma, serum, urine, saliva, sputum, cerebrospinal fluid (CSF), skin, intestinal fluid, intraperitoneal fluid, cystic fluid, sweat, interstitial fluid, extracellular fluid, tears, mucus, bladder wash, semen, fecal, pleural fluid, nasopharyngeal fluid, and combinations thereof.

In a particular (but non-limiting) embodiment of the presently disclosed inventive concept(s), the method is further defined as a method of measuring a level of magnesium ion present in a biological sample. In the method, any of the potentiometric ion selective electrodes described or otherwise contemplated herein is contacted with a biological sample, and a level of magnesium ion present in the biological sample is measured using the potentiometric ion selective electrode. The method may further include the step of reporting the results of said measurement(s) by any method known or otherwise contemplated in the art.

Certain embodiments of the presently disclosed inventive concept(s) are directed to a multi-use sensor array assembly that includes a plurality of multi-use sensors, wherein one or more of the plurality of multi-use sensors is one of the potentiometric ion selective electrodes described or otherwise contemplated herein. The remaining sensors present in the multi-use sensor array assembly may be any multi-use sensor known in the art for use with blood gas, electrolyte, and/or metabolite instrumentation for detection of one or more analytes potentially present in a fluidic biological sample.

Additional embodiments of the presently disclosed inventive concept(s) are directed to a method for detecting the presence and/or concentration of a plurality of target analytes in a fluidic biological sample using said multi-use sensor array assembly. In the method, a fluidic biological sample is inserted into a blood gas, electrolyte, and/or metabolite instrument containing the multi-use sensor array assembly, and the presence and/or concentration of each of the plurality of target analytes detected by the individual multi-use sensors of the array assembly is measured. The method may further include the step of reporting the results of said measurements by any method known or otherwise contemplated in the art.

Any of the detection methods described or otherwise contemplated herein may further include the step of contacting the potentiometric ion selective electrode with a reagent comprising a poly(ethylene oxide) surfactant. The poly(ethylene oxide) surfactant may be utilized at any concentration that allows the surfactant and the potentiometric ion selective electrode to function in accordance with the presently disclosed inventive concept(s). A non-limiting example of a poly(ethylene oxide) surfactant concentration that falls within the scope of the presently disclosed inventive concept(s) is less than about 100 mg/L.

Any poly(ethylene oxide) surfactants known or otherwise contemplated within the art and capable of functioning as described herein may be utilized in accordance with the presently disclosed inventive concept(s). Non-limiting examples of poly(ethylene oxide) surfactants that may be utilized in accordance with the presently disclosed inventive concept(s) are represented by the structures of Formulas V-VII.

In Formula V, n is in the range of from about 9 to about 10; in Formula VII, n is about 100. One non-limiting example of a surfactant represented by the structure of Formula V (for example, t-octylphenoxypolyethoxyethanol) is sold under the trade name TRITON™ X-100 (Sigma-Aldrich, St. Louis, Mo.). One non-limiting example of a surfactant represented by the structure of Formula VI (for example, polyoxyethylene 23 lauryl ether) is known in the art by the product designation Brij-35. A non-limiting example of a surfactant represented by the structure of Formula VII (wherein n is about 100) is polyoxyethylene (100) stearyl ether nonionic surfactant, which is known in the art by the product designation Brij-700 (CAS No. 9005-00-9). Particular non-limiting examples of the surfactants represented by the structure of Formula VII are disclosed in U.S. Pat. No. 8,496,900, issued to Zhang et al. on Jul. 30, 2013.

Yet another embodiment of the presently disclosed inventive concept(s) includes a kit containing any of the internal electrolyte layer(s), potentiometric ion selective electrode(s), and/or multi-use sensory array assemblies described or otherwise contemplated herein. In addition, the kit may further include one or more reagents, such as (but not limited to) one or more reagents that comprise a poly(ethylene oxide) surfactant as described or otherwise contemplated herein. The reagent(s) may be one or more calibration reagents, one or more wash reagents, or one or more quality control reagents, or any combination of the above.

In addition, the kit may further contain other reagent(s) for conducting any of the particular methods described or otherwise contemplated herein. The nature of these additional reagent(s) will depend upon the particular assay format, and identification thereof is well within the skill of one of ordinary skill in the art.

The components/reagents may each be disposed in separate containers/compartments of the kit, or various components/reagents can be combined in one or more containers/compartments of the kit, depending on the competitive nature of the components/reagents and/or the stability of the components/reagents. The kit can further include other separately packaged reagents for conducting an assay. The relative amounts of the various components/reagents in the kits can vary widely to provide for concentrations of the components/reagents that substantially optimize the reactions that need to occur during the assay methods and further to optimize substantially the stability/sensitivity of an assay. Positive and/or negative controls may also be included with the kit.

The kit can further include a set of written instructions explaining how to use the kit. For example but not by way of limitation, the kit may further include instructions for rinsing, calibrating, and/or operating the potentiometric ion selective electrode. A kit of this nature can be used in any of the methods described or otherwise contemplated herein.

EXAMPLES

Examples are provided hereinbelow. However, the presently disclosed inventive concept(s) is to be understood to not be limited in its application to the specific experimentation, results, and laboratory procedures disclosed herein below. Rather, the Examples are simply provided as one of various embodiments and are meant to be exemplary, not exhaustive.

Materials and Methods:

Ion selective electrodes were produced as follows. Two types of internal electrolyte layers were produced for use in Formula V

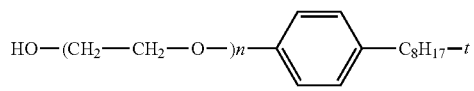

Formula VI

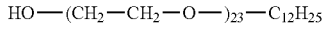

Formula VII

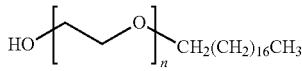

the example. A prior art aqueous internal electrolyte layer (Aq IE) was produced that included 10 mM $MgCl_2$ in deionized water (DI $H_2O$). An internal electrolyte layer comprising carbon paste doped with $MgCl_2$ (CP IE) was produced in three formulations:
  i) CP1—5.02 grams paste spiked with 0.005 ml of 0.6 M $MgCl_2$;
  ii) CP2—5.02 grams paste spiked with 0.035 ml of 0.6 M $MgCl_2$; and
  iii) CP3—5.02 grams paste spiked with 0.135 ml of 0.6 M $MgCl_2$.

All three CP IE formulations were found to work for iMg sensor response; among them, CP-3 was found to yield the most stable and fastest response in aqueous solutions.

The magnesium sensing cover membrane was produced according to the following formulation:
  Mg Ionophore ETH5506 at 3 wt %;
  KTpClPB at 75 mol % to ETH 5506;
  Plasticizer ETH217 at 55 wt %;
  PVC at 41 wt %; and
  tetrahydrofuran (THF) as solvent.

The cover membrane was cast in a glass ring (d=1.5 inch) on a glass plate and then cured overnight.

TYGON® Tubing (d=0.5 inch; Saint-Gobain Corp., La Défense, Courbevoie, France) was cut into 1 inch long segments, and a cover membrane disc (d=0.5 inch) was attached to one end of the TYGON® tubing with help of THF melting. After dry-out, the carbon paste internal electrolyte layer or aqueous internal electrolyte solution layer was added into the sealed TYGON® tubing.

Potentiometric setup was achieved by inserting an Ag/AgCl wire in the IE/TYGON® tubing produced above, and an external Ag/AgCl reference electrode was used to setup a typical potentiometric measuring system. Lawson Labs' EMF16 Precision Electrochemistry EMF Interface (Lawson Labs, Inc., Malvern, Pa.) was used for signal mV acquisition. See FIG. 1 for a depiction of the setup used.

Two series of solutions were used in the assays. These solution series were formulated as follows:
  Solution series 1: $MgCl_2$ in DI $H_2O$: 0.1, 0.5, 1.0, 10 mM; and
  Solution series 2: $CaCl_2$ in DI $H_2O$: 0.1, 0.5, 1.0, 10 mM.

Figure 2:
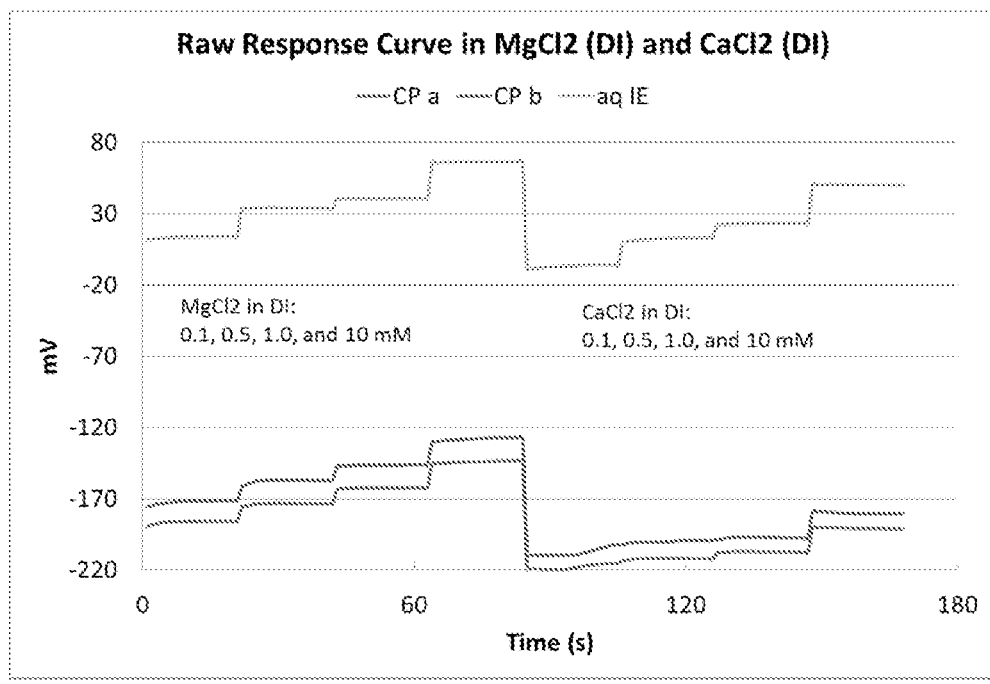
FIG. 2 graphically illustrates raw response curves of a carbon paste internal electrolyte layer (CP IE) compared to a prior art aqueous internal electrolyte layer (Aq IE) in $MgCl_2$ and $CaCl_2$ solution series (DI $H_2O$).

Results and Discussion:

FIG. 2 graphically illustrates raw response curves of a carbon paste internal electrolyte layer (CP IE) compared to a prior art aqueous internal electrolyte layer (Aq IE) in $MgCl_2$ and $CaCl_2$ solution series (DI $H_2O$).

Figure 3:
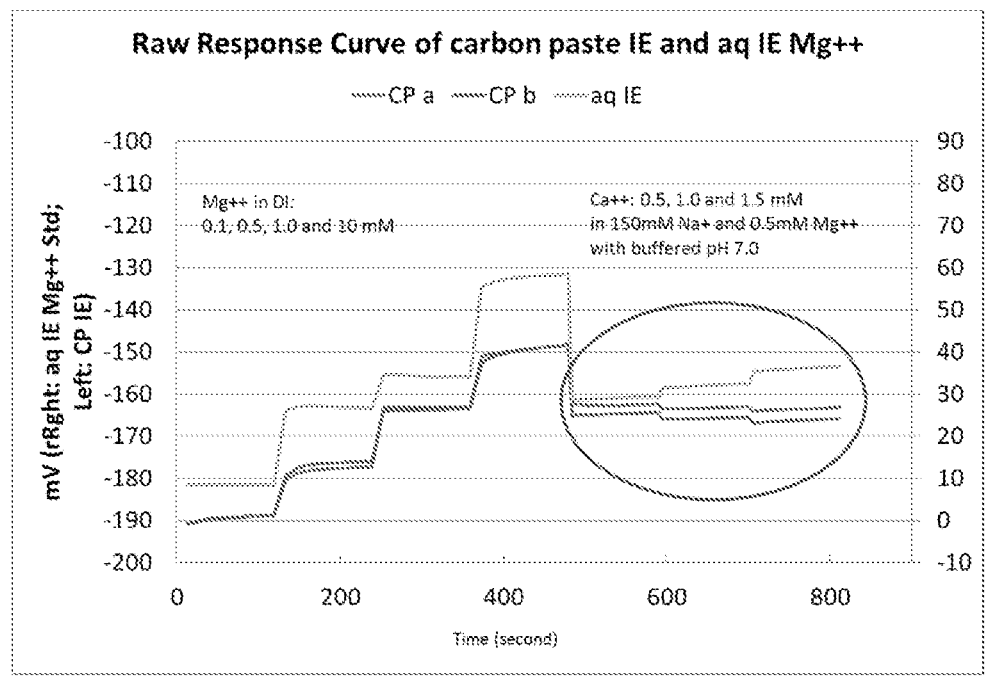
FIG. 3 graphically illustrates raw response curves of CP IE and Aq IE in $MgCl_2$ solution series (DI $H_2O$) and $CaCl_2$ solution series (buffered background).

FIG. 3 graphically illustrates raw response curves of CP IE and Aq IE in $MgCl_2$ solution series (DI $H_2O$) and $CaCl_2$ solution series (buffered background).

Figure 4:
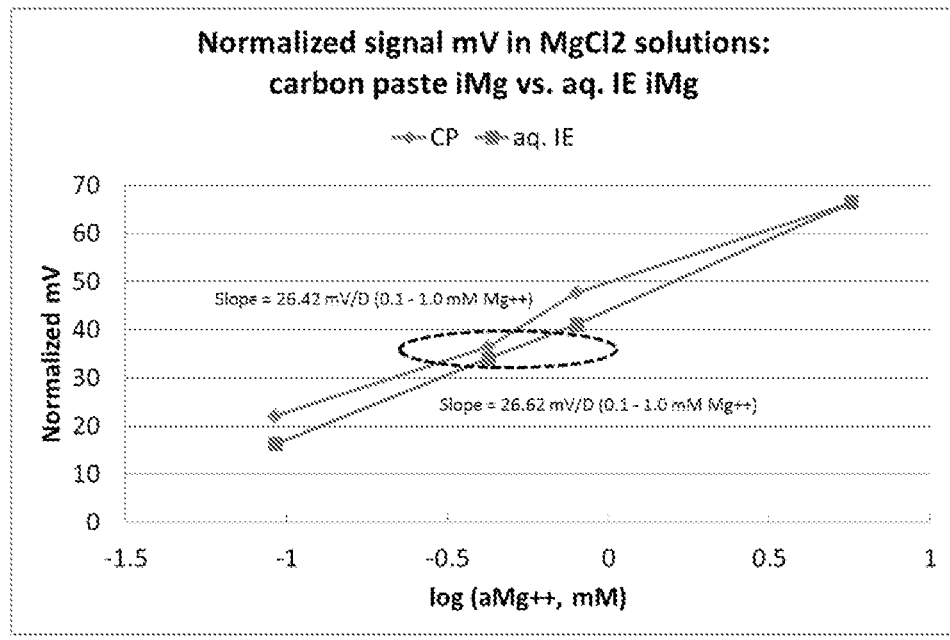
FIG. 4 graphically illustrates normalized signals of CP iMg and standard IE iMg in Solution Series 1: $MgCl_2$ solutions. The circled concentration range is the ionized $Mg^{2+}$ reporting concentration range in clinical range.

FIG. 4 graphically illustrates normalized signals of CP iMg and standard IE iMg in Solution Series 1: $MgCl_2$ solutions. The circled concentration range is the ionized $Mg^{2+}$ reporting concentration range.

Figure 5:
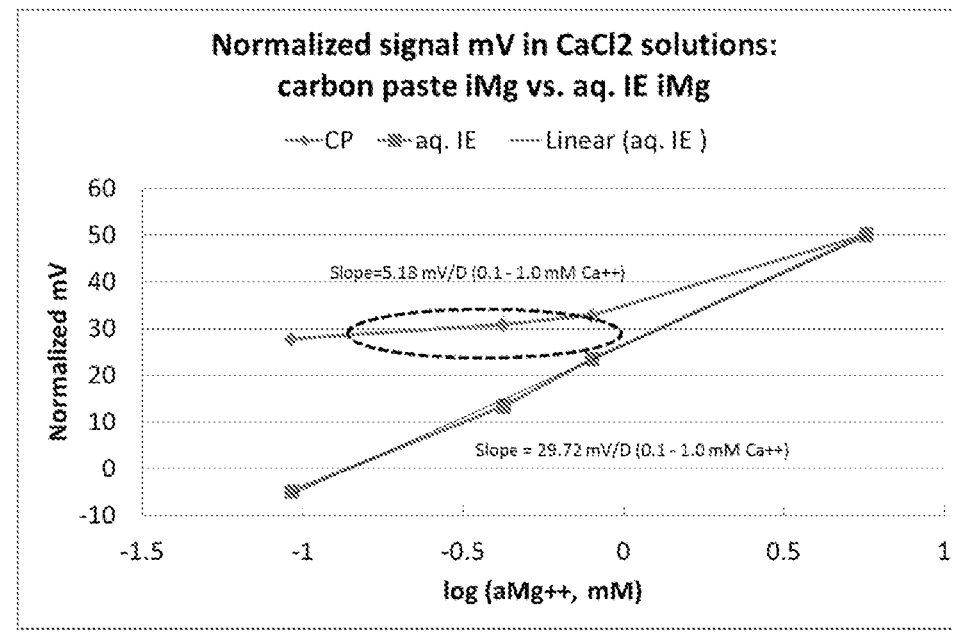
FIG. 5 graphically illustrates normalized signals of CP iMg and standard IE iMg in Solution Series 2: $CaCl_2$ solutions. The circled concentration range is the $Ca^{2+}$ reporting concentration range.

FIG. 5 graphically illustrates normalized signals of CP iMg and standard IE iMg in Solution Series 2: $CaCl_2$ solutions. The circled concentration range is the $Ca^{2+}$ reporting concentration range.

Figure 6:
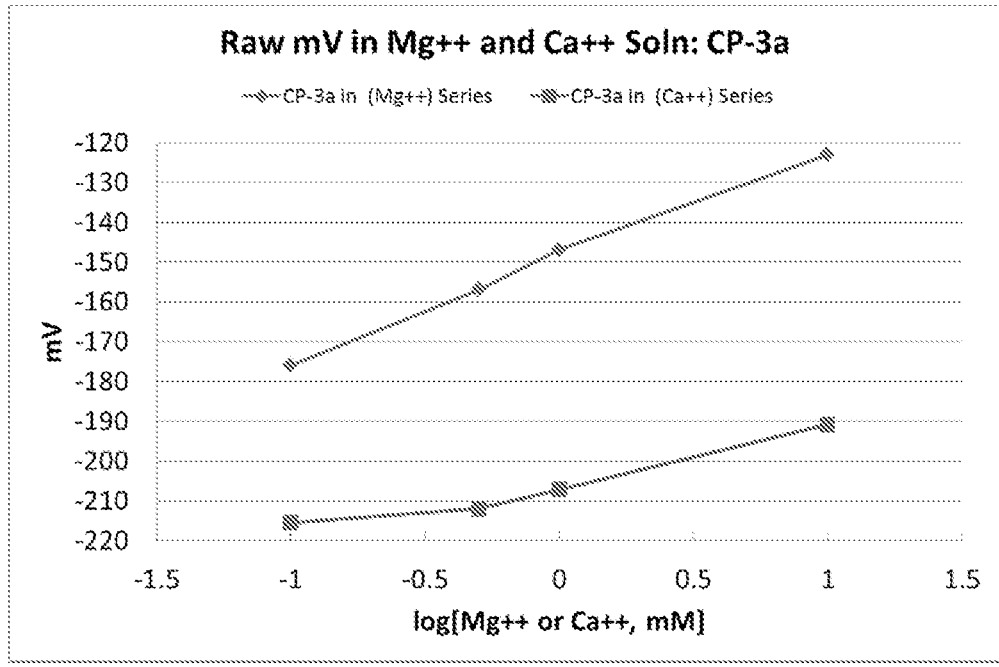
FIG. 6 graphically illustrates raw signals of CP IE in $Mg^{2+}$ solution series and $Ca^{2+}$ solution series.

FIG. 6 graphically illustrates raw signals of CP IE in $Mg^{2+}$ solution series and $Ca^{2+}$ solution series.

Figure 7:
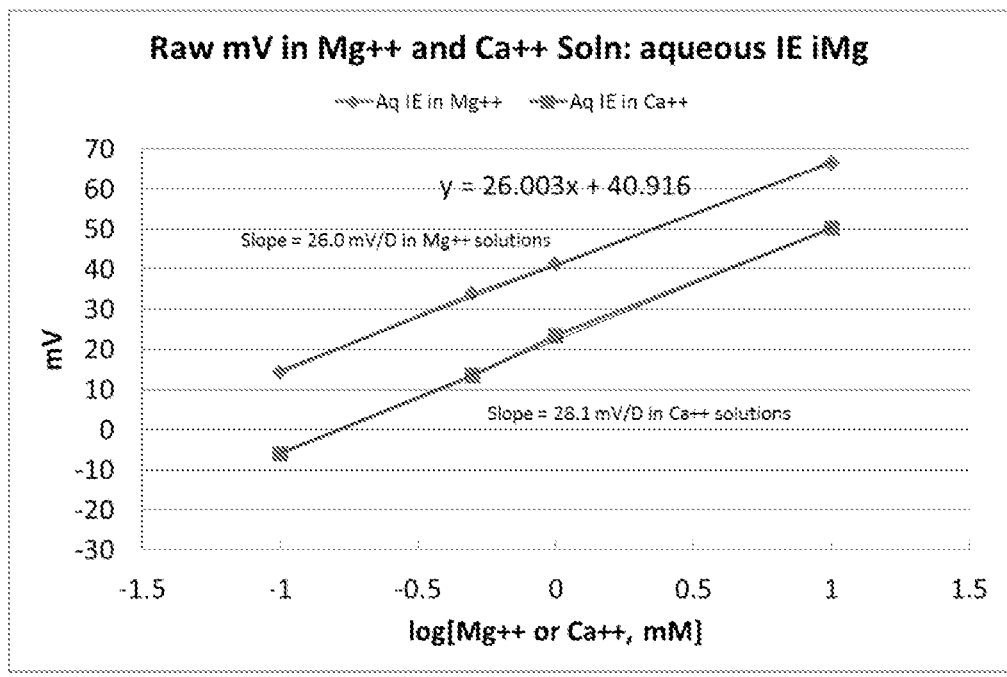
FIG. 7 graphically illustrates raw signals of aqueous IE in $Mg^{2+}$ solution series and $Ca^{2+}$ solution series.

FIG. 7 graphically illustrates raw signals of aqueous IE in $Mg^{2+}$ solution series and $Ca^{2+}$ solution series.

Figure 8:
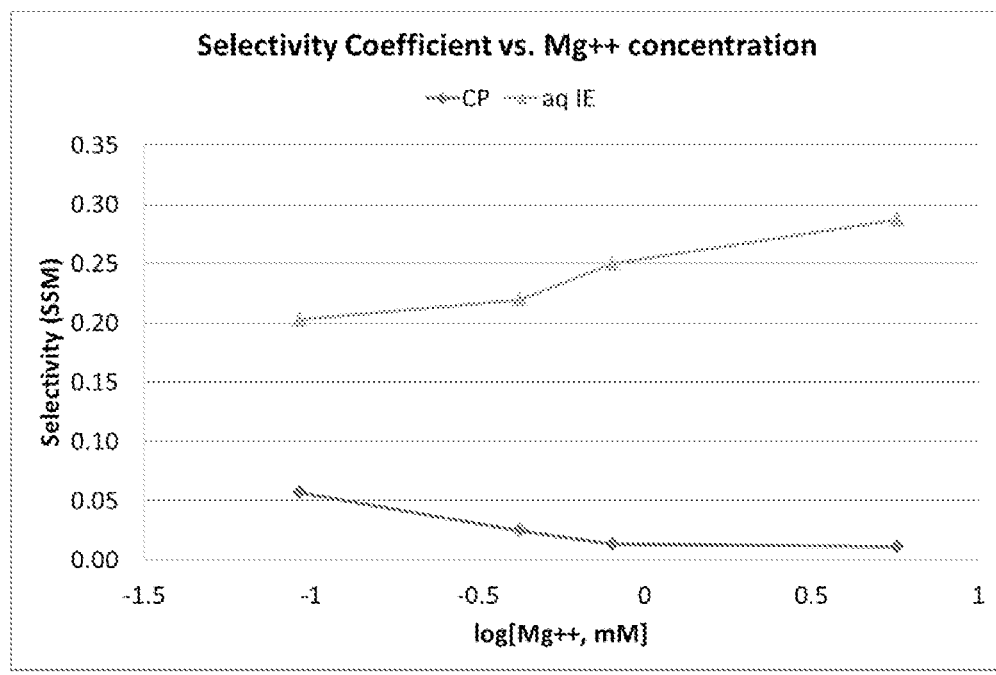
FIG. 8 graphically illustrates a calculated selectivity coefficient (SSM) over $Ca^{2+}$ at different $Mg^{2+}$ concentrations. (1) Selectivity coefficients (SSM) for carbon paste IE and aqueous $MgCl_2$ IE are diverged along with $Mg^{2+}$ concentration inclination. (2) Along with $Mg^{2+}$ concentration increase, CP IE iMg sensor shows declination of selectivity coefficient. $K^{pot}_{Mg,Ca}$ near 0.02 for $Mg^{2+}$ concentration ranges from 0.5 mM to 10 mM. An activity coefficient of each solution is used to calculate molar activity.

The CP IE iMg sensor possessed a similar response sensitivity as a classical aqueous salt solution IE iMg sensor (see FIGS. 2 and 4), especially in the clinical reporting range (0.1-1.0 mM $Mg^{2+}$). Surprisingly, the CP IE iMg sensor exhibited a much reduced sensitivity to $Ca^{2+}$ concentration variation (FIG. 2). With constant $Mg^{2+}$ (0.5 mM) and other electrolyte background of Na+ (150 mM), buffered pH of 7.2, the CP IE iMg sensors showed almost no $Ca^{2+}$ sensitivity, while the aqueous IE iMg sensors exhibited a Nernstian response slope of 29.72 mV/Dec from 0.1 mM $Ca^{2+}$ to 1.0 mM $Ca^{2+}$ (FIGS. 3 and 5). The CP IE iMg sensor showed a much higher signal output (offset) in $Mg^{2+}$ solutions than in $Ca^{2+}$ solutions; such difference of signal output (offset difference) is relevant to the response selectivity for $Mg^{2+}$ against $Ca^{2+}$. As shown in FIGS. 6 and 7, the CP IE iMg sensor had a much larger offset difference than the current aqueous IE iMg sensors; this difference leads to a significant improvement of the selectivity coefficient with the CP IE iMg sensor (FIG. 8). While not wishing to be bound by theory, a possible reason can be correlated to the detection limit change of $Ca^{2+}$ with the CP IE iMg sensor that its detection limit of $Mg^{2+}$ does not change. In the clinical reporting range, the selectivity coefficient of $Mg^{2+}$ against $Ca^{2+}$ can be drastically improved with the CP IE iMg sensor of the presently disclosed inventive concept(s).

Table 1 illustrates the Selectivity Coefficient (Separate Solution Method) of the various IE sensors over $Ca^{2+}$ at varying $Mg^{2+}$ concentrations. With the increase of $Mg^{2+}$ concentration in sample, the prior art Aq IE sensor exhibited increasing $K^{pot}_{Mg,Ca}$ values (SSM), while the CP IE sensor exhibited decreasing $K^{pot}_{Mg,Ca}$. This trend is also reflected in FIG. 6.

TABLE 1

| $Mg^{2+}$ Conc. (mM) | $Mg^{2+}$ Activity (mM) | log (a$Mg^{2+}$, mM) | $K^{pot}_{Mg,Ca}$ CP | $K^{pot}_{Mg,Ca}$ Aq IE |
|---|---|---|---|---|
| 0.1 | 0.0925 | −1.034 | 0.054 | 0.203 |
| 0.5 | 0.424 | −0.373 | 0.020 | 0.220 |
| 1 | 0.799 | −0.097 | 0.009 | 0.249 |
| 10 | 5.72 | 0.757 | 0.008 | 0.287 |

The conventional Aq IE iMg sensor showed that $K^{pot}_{Mg,Ca}$ was in the range of 0.2-0.3, which is much higher than the required selectivity for an iMg sensor ($K^{pot}_{Mg,Ca\,(required)}$=0.02). Therefore, an algorithm correction on $Ca^{2+}$ interference must be used to meet the allowable precision error of <1%.

However, the CP IE iMg sensor reached $K^{pot}_{Mg,Ca} \leq 0.02$ (SSM) in a normal to high $Mg^{2+}$ concentration range (0.5-10 mM $Mg^{2+}$), which is about 10 times (one magnitude) better than a conventional Aq IE sensor. Since this $K^{pot}_{Mg,Ca}$ was very close to the required selectivity coefficient against $Ca^{2+}$ ($K^{pot}_{Mg,Ca\,(required)}$=0.02), the CP IE sensor is capable of measuring $Mg^{2+}$ with no to minimal and "light" algorithm correction on $Ca^{2+}$ interference. As such, the quality of a blood $Mg^{2+}$ assay can be significantly improved.

FIG. 8 graphically illustrates the Calculated Selectivity Coefficient (SSM) of various IE sensors over $Ca^{2+}$ at different $Mg^{2+}$ concentrations; (1) Selectivity coefficients (SSM) for carbon paste IE and aqueous MgCl2 IE are diverged along with $Mg^{2+}$ concentration inclination. (2) In addition to $Mg^{2+}$ concentration increase, the CP IE iMg sensor exhibited a declination of selectivity coefficient. $K^{pot}_{Mg,Ca}$ near 0.02 was observed for $Mg^{2+}$ concentration ranges from 0.5 mM to 10 mM; this means that the CP IE iMg sensor can measure blood $Mg^{2+}$ with minimal $Ca^{2+}$ correction or even no $Ca^{2+}$ correction, compared to the conventional Aq IE iMg sensor.

NON-LIMITING EMBODIMENTS OF THE INVENTIVE CONCEPT(S)

Certain embodiments are directed to an internal electrolyte layer for a potentiometric ion selective electrode. The internal electrolyte layer comprises a carbon paste and a metal salt dispersed in the carbon paste; the internal electrolyte layer is capable of associating with an internal reference electrode and an ion sensing membrane to form a potentiometric ion selective electrode. The metal salt may be $MgCl_2$, HCl, NaCl, KCl, $KNO_3$, or $NaClO_4$.

Certain embodiments are directed to a potentiometric ion selective electrode that comprises: (a) an internal reference electrode; (b) an internal electrolyte layer comprising a carbon paste having a metal salt dispersed therein, wherein at least a portion of the internal electrolyte layer is associated with at least a portion of the internal reference electrode; and (c) an ion sensing membrane, wherein at least a portion of the ion sensing membrane is associated with at least a portion of the internal electrolyte layer. In certain embodiments, the ion sensing membrane is selected from the group comprising a magnesium sensing membrane, a potassium sensing membrane, a calcium sensing membrane, a sodium sensing membrane, a chlorine sensing membrane, and a pH sensing membrane. In certain embodiments, the metal salt is selected from the group comprising $MgCl_2$, HCl, NaCl, KCl, $KNO_3$, and $NaClO_4$. In a particular embodiment, the ion sensing membrane is further defined as a magnesium sensing membrane, and the metal salt present in the internal electrolyte layer is $MgCl_2$.

In certain embodiments, the magnesium sensing membrane is further defined as comprising: (a) an ionophore having a tripodal stereochemical structure; (b) a lipophilic borate salt, wherein the lipophilic borate salt is present in an amount that provides a mol ratio of lipophilic borate salt to ionophore in a range of from about 60 mol % to about 100 mol %; and (c) a polymer matrix in which the ionophore and lipophilic borate salt are disposed, wherein the polymer matrix comprises a polymer and a plasticizer. The ionophore may be represented by the structure of one of Formulas I-IV:

Formula I

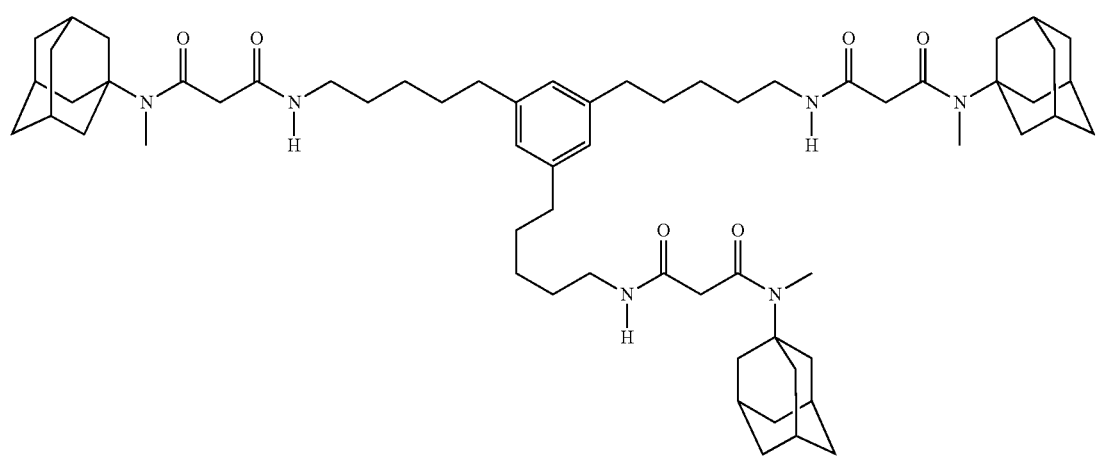

Formula II

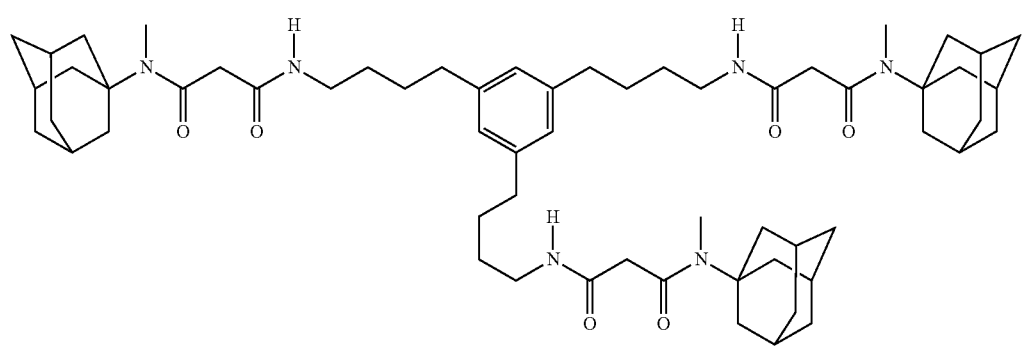

Formula III

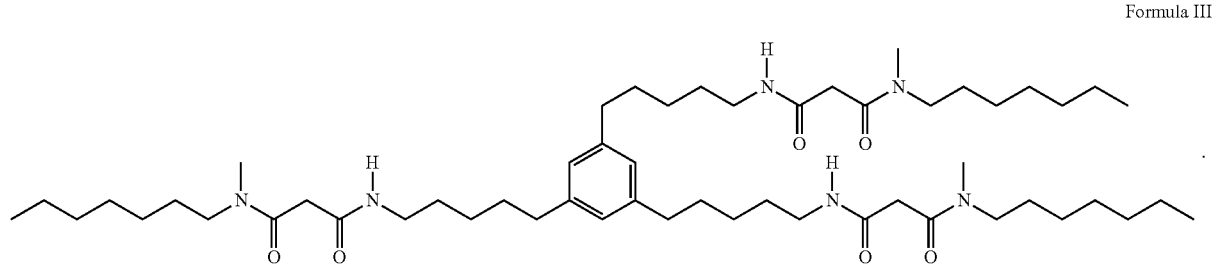

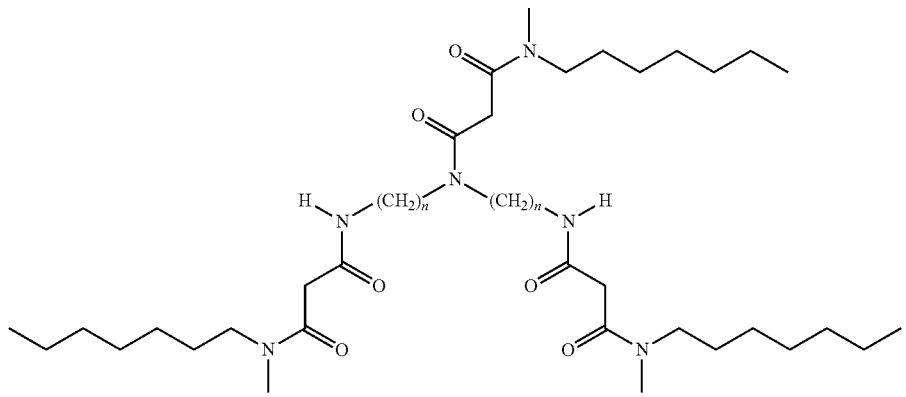

Formula IV wherein in Formula IV, n is in the range of from about 6 to about 8.

In certain embodiments of the potentiometric ion selective electrode, the lipophilic borate salt is selected from the group comprising potassium tetrakis[3,5-bis(trifluoromethyl)phenyl]borate; sodium tetrakis[3,5-bis(trifluoromethyl)phenyl]borate; and potassium tetrakis(4-chlorophenyl)borate. In certain embodiments, the plasticizer is selected from the group comprising 2-nitrophenyl octyl ether, 2-Nitrophenyl dodecyl ether and [12-(4-ethylphenyl)dodecyl] 2-nitrophenyl ether. In certain embodiments, the mol ratio of lipophilic borate salt to ionophore is about 80 mol %. In certain embodiments, the electrode is further defined as a solid-state, planar magnesium sensing membrane. In certain embodiments, the internal reference electrode comprises at least one of gold and silver. In a particular embodiment, the internal reference electrode comprises a silver wire with a silver chloride layer disposed thereon.

The potentiometric ion selective electrode is further defined in particular embodiments as a multi-use potentiometric ion selective electrode that has a use-life of at least 14 days.

Certain embodiments are directed to a method of producing a potentiometric ion selective electrode. The method comprises the steps of: (a) dispersing a metal salt in a carbon paste to form an internal electrolyte layer; (b) screen printing at least a portion of the internal electrolyte layer on at least a portion of an internal reference electrode; and (c) disposing at least a portion of an ion sensing membrane on at least a portion of the internal electrolyte layer.

In certain embodiments of the method, the ion sensing membrane is selected from the group comprising a magnesium sensing membrane, a potassium sensing membrane, a calcium sensing membrane, a sodium sensing membrane, a chlorine sensing membrane, and a pH sensing membrane. In certain embodiments of the method, the metal salt dispersed in the carbon paste is selected from the group comprising $MgCl_2$, HCl, NaCl, KCl, $KNO_3$, and $NaClO_4$. In certain embodiments, the metal salt may be in a solution when dispersed in the carbon paste. Examples of such a solution include water based solutions. In a particular embodiment of the method, the ion sensing membrane is further defined as a magnesium sensing membrane, and the metal salt present in the internal electrolyte layer is $MgCl_2$.

In certain embodiments of the method, the magnesium sensing membrane is further defined as comprising: (a) an ionophore having a tripodal stereochemical structure; (b) a lipophilic borate salt, wherein the lipophilic borate salt is present in an amount that provides a mol ratio of lipophilic borate salt to ionophore in a range of from about 60 mol % to about 100 mol %; and (c) a polymer matrix in which the ionophore and lipophilic borate salt are disposed, wherein the polymer matrix comprises a polymer and a plasticizer. The ionophore may be represented by the structure of one of Formulas I-IV above.

Certain embodiments are directed to a method for detecting the presence and/or concentration of a target ion analyte in a fluidic biological sample, the method comprising the steps of: (i) contacting the potentiometric ion selective electrode described herein above with a biological sample; and (ii) measuring a level of a specific ion in the biological sample using the potentiometric ion selective electrode. Certain particular embodiments of the method include the additional step of contacting the potentiometric ion selective electrode with a reagent comprising a poly(ethylene oxide) surfactant. In a particular embodiment, the poly(ethylene oxide) surfactant is represented by the structure of Formula VII:

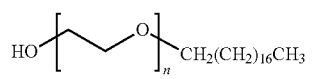

Formula VII wherein n is about 100. In certain embodiments, the fluidic biological sample is selected from the group comprising blood, plasma, serum, urine, saliva, sputum, cerebrospinal fluid (CSF), skin, intestinal fluid, intraperitoneal fluid, cystic fluid, sweat, interstitial fluid, extracellular fluid, tears, mucus, bladder wash, semen, fecal, pleural fluid, nasopharyngeal fluid, and combinations thereof.

Certain embodiments are directed to a multi-use sensor array assembly that comprises a plurality of multi-use sensors, wherein at least one of the plurality of multi-use sensors is one of the potentiometric ion selective electrodes described herein above.

Certain embodiments are directed to a method for detecting the presence and/or concentration of a plurality of target analytes in a fluidic biological sample. The method comprises the steps of: (a) inserting a fluidic biological sample into a blood gas, electrolyte, and/or metabolite instrument containing the multi-use sensor array assembly described herein above; and (b) measuring the presence and/or concentration of each of the plurality of target analytes detected by the individual multi-use sensors of the array assembly. In certain embodiments, the fluidic biological sample is selected from the group comprising blood, plasma, serum, urine, saliva, sputum, cerebrospinal fluid (CSF), skin, intestinal fluid, intraperitoneal fluid, cystic fluid, sweat, interstitial fluid, extracellular fluid, tears, mucus, bladder wash, semen, fecal, pleural fluid, nasopharyngeal fluid, and combinations thereof.

Thus, in accordance with the presently disclosed inventive concept(s), there have been provided compositions and devices, as well as methods of producing and using same, which fully satisfy the objectives and advantages set forth hereinabove. Although the presently disclosed inventive concept(s) has been described in conjunction with the specific drawings, experimentation, results and language set forth hereinabove, it is evident that many alternatives, modifications, and variations will be apparent to those skilled in the art. Accordingly, it is intended to embrace all such alternatives, modifications and variations that fall within the spirit and broad scope of the presently disclosed inventive concept(s).

REFERENCES

The following references, to the extent that they provide exemplary procedural or other details supplementary to those set forth herein, are specifically incorporated herein by reference. In addition, the following is not intended to be an Information Disclosure Statement; rather, an Information Disclosure Statement in accordance with the provisions of 37 CFR § 1.97 will be submitted separately.

Ursula E. Spichiger, Rudolf Eugster, E. Haase, G. Rumpf, Peter Gehrig, Angcla Schmid, Bruno Rusterholz, and Wilhelm Simon. "Critical parameters and optimization of a magnesium-selective liquid membrane electrode for application to human blood serum." *Fresenius J Anal Chem* (1991) 341:727-731.

W. Zhang, L. Jenny, U. E. Spichiger. "A comparison of neutral $Mg^{2+}$-selective ionophores in solvent polymeric membranes: complex stoichiometry and lipophilicity. *Analytical Sciences* (2000) 16:11-18.

Ursula E. Spichiger. "History of the Development of Magnesium-Selective Ionophores and Magnesium-Selective Electrodes." *Electroanalysis* (1993) 5:739-745.

Wei Zhang. "Study of Physiologically Required Selectivity Coefficients of Potentiometric Sensors in Clinical Assays." *Life Science Journal* (2005) 2(1):40-45.

W. Zhang, K. Horan, U. Laura. International Patent Application Publication No. WO 2010/021923. "Use of polyoxyalkylene nonionic surfactants with magnesium ion selective electrodes." Published Feb. 25, 2010.

What is claimed is:

1. A potentiometric magnesium ion selective electrode, comprising:
    (a) an internal reference electrode;
    (b) an internal electrolyte layer comprising a carbon paste having MgCl2 dispersed therein, wherein at least a first portion of the internal electrolyte layer is associated with at least a portion of the internal reference electrode; and
    (c) a magnesium ion sensing membrane, wherein at least a portion of the magnesium ion sensing membrane is associated with at least a second portion of the internal electrolyte layer, and wherein the magnesium ion sensing membrane comprises:
    an ionophore having a tripodal stereochemical structure;
    a lipophilic borate salt, wherein the lipophilic borate salt is present in an amount that provides a mol ratio of lipophilic borate salt to the ionophore in a range of from about 60 mol % to about 100 mol %; and
    a polymer matrix in which the ionophore and lipophilic borate salt are disposed, wherein the polymer matrix comprises a polymer and a plasticizer; and
    wherein the potentiometric magnesium ion selective electrode has a selectivity coefficient ($K^{pot}_{Mg,Ca}$) for $Mg^{2+}$ over $Ca^{2+}$ of less than or equal to about 0.02 at a $Mg^{2+}$ concentration in a range of from 0.5 mM to 10 mM.

2. The potentiometric magnesium ion selective electrode of claim 1, wherein the ionophore is represented by the structure of one of Formulas I-IV:

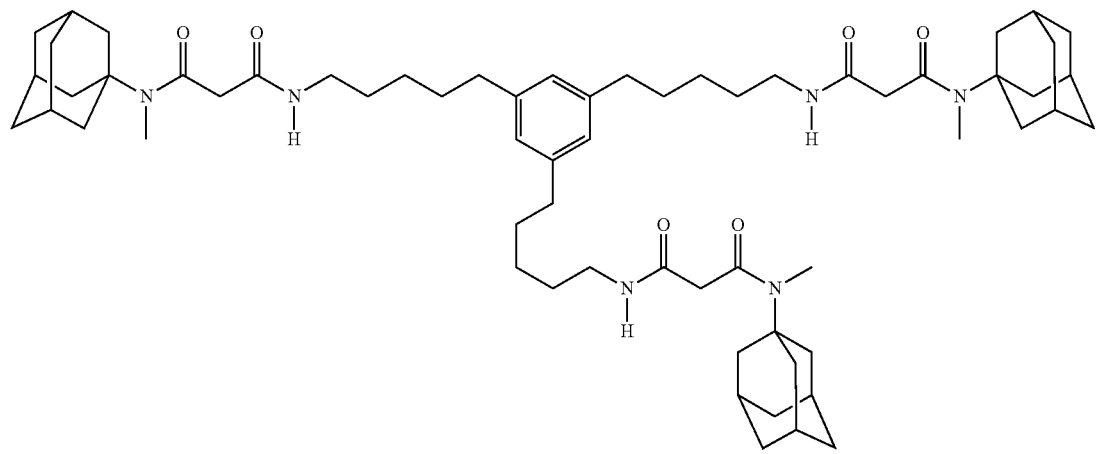

Formula I

-continued

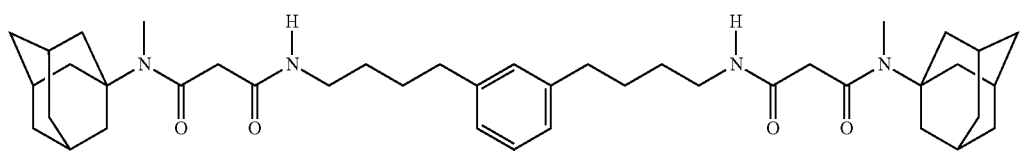

Formula II

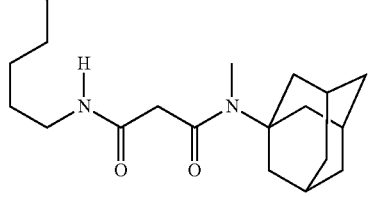

Formula III

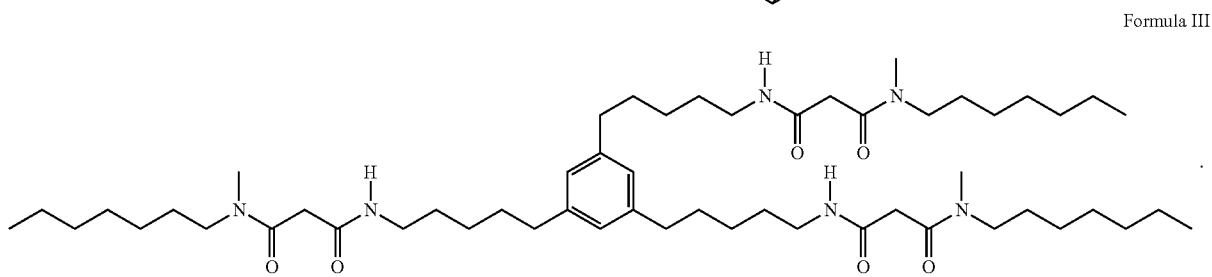

Formula IV

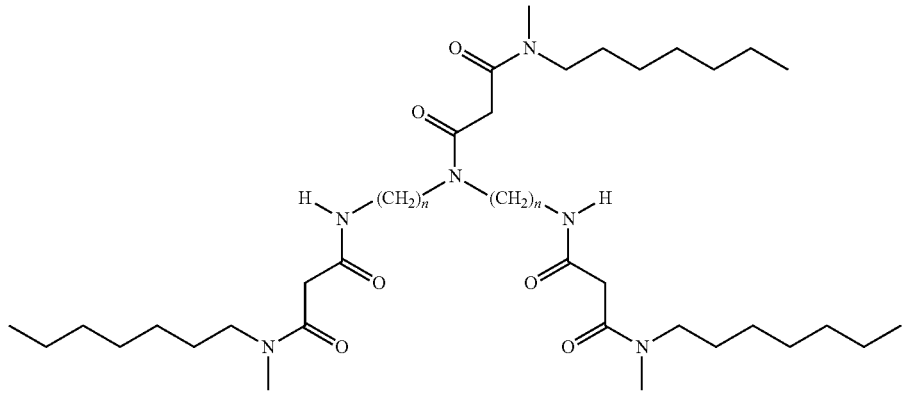

wherein in Formula IV, n is in the range of from about 6 to about 8.

3. The potentiometric magnesium ion selective electrode of claim 1, wherein at least one of:
  (i) the lipophilic borate salt is selected from the group comprising potassium tetrakis[3,5-bis(trifluoromethyl)phenyl]borate; sodium tetrakis[3,5-bis(trifluoromethyl)phenyl]borate; and potassium tetrakis(4-chlorophenyl)borate;
  (ii) the plasticizer is selected from the group comprising 2-nitrophenyl octyl ether, 2-Nitrophenyl dodecyl ether and [12-(4-ethylphenyl)dodecyl] 2-nitrophenyl ether;
  (iii) the mol ratio of lipophilic borate salt to the ionophore is about 80 mol %; and
  (iv) the electrode is further defined as a solid-state, planar magnesium sensing membrane.

4. The potentiometric magnesium ion selective electrode of claim 1, wherein the internal reference electrode comprises at least one of gold and silver.

5. The potentiometric magnesium ion selective electrode of claim 4, wherein the internal reference electrode comprises a silver wire with a silver chloride layer disposed thereon.

6. The potentiometric magnesium ion selective electrode of claim 1, further defined as a multi-use potentiometric ion selective electrode that has a use-life of at least 14 days.

7. A method of producing a potentiometric magnesium ion selective electrode, the method comprising the steps of:
  dispersing a $MgCl_2$ solution in a carbon paste to form an internal electrolyte layer, wherein the $MgCl_2$ is present in the internal electrolyte layer;
  screen printing at least a portion of the internal electrolyte layer on at least a portion of an internal reference electrode; and
  disposing at least a portion of a magnesium ion sensing membrane on at least a portion of the internal electrolyte layer, wherein the magnesium sensing membrane is further defined as comprising:
    an ionophore having a tripodal stereochemical structure;
    a lipophilic borate salt, wherein the lipophilic borate salt is present in an amount that provides a mol ratio of lipophilic borate salt to ionophore in a range of from about 60 mol % to about 100 mol %; and
    a polymer matrix in which the ionophore and lipophilic borate salt are disposed, wherein the polymer matrix comprises a polymer and a plasticizer; and
  wherein the potentiometric magnesium ion selective electrode has a selectivity coefficient ($K^{pot}_{Mg,Ca}$) for $Mg^{2+}$ over $Ca^{2+}$ of less than or equal to about 0.02 at a $Mg^{2+}$ concentration in a range of from 0.5 mM to 10 mM.

8. A method for detecting the presence and/or concentration of magnesium ion in a fluidic biological sample, comprising the steps of:

contacting the potentiometric magnesium ion selective electrode of claim 1 with the fluidic biological sample; and measuring a level of magnesium ion in the fluidic biological sample using the potentiometric magnesium ion selective electrode.

9. The method of claim 8, wherein the fluidic biological sample is selected from the group comprising blood, plasma, serum, urine, saliva, sputum, cerebrospinal fluid (CSF), skin, intestinal fluid, intraperitoneal fluid, cystic fluid, sweat, interstitial fluid, extracellular fluid, tears, mucus, bladder wash, semen, fecal, pleural fluid, nasopharyngeal fluid, and combinations thereof.

10. The method of claim 8, further comprising the step of contacting the potentiometric magnesium ion selective electrode with a reagent comprising a poly(ethylene oxide) surfactant.

11. A multi-use sensor array assembly, comprising:

a plurality of multi-use sensors, at least one of the plurality of multi-use sensors being the potentiometric magnesium ion selective electrode of claim 1.

12. A method for detecting the presence and/or concentration of a plurality of target analytes in a fluidic biological sample, the method comprising the steps of:

(a) inserting the fluidic biological sample into a blood gas, electrolyte, and/or metabolite instrument containing the multi-use sensor array assembly of claim 11; and (b) measuring the presence and/or concentration of each of the plurality of target analytes detected by the individual multi-use sensors of the array assembly.

* * * * *